US012268344B1

(12) United States Patent
Liu

(10) Patent No.: US 12,268,344 B1
(45) Date of Patent: Apr. 8, 2025

(54) HAND SANITIZER DEVICE

(71) Applicant: Tianjue Liu, Guizhou (CN)

(72) Inventor: Tianjue Liu, Guizhou (CN)

( * ) Notice: Subject to any disclaimer, the term of this patent is extended or adjusted under 35 U.S.C. 154(b) by 0 days.

(21) Appl. No.: 18/816,346

(22) Filed: Aug. 27, 2024

(30) Foreign Application Priority Data

Dec. 19, 2023 (CN) ........................ 202323468776.X

(51) Int. Cl.
*A47K 5/14* (2006.01)
*B05B 7/00* (2006.01)

(52) U.S. Cl.
CPC .............. *A47K 5/14* (2013.01); *B05B 7/0037* (2013.01)

(58) Field of Classification Search
CPC ............... B05B 7/0037; B05B 11/1087; B05B 11/1047; A47K 5/12; A47K 5/14; A47K 5/16
USPC .......................................................... 222/190
See application file for complete search history.

(56) References Cited

U.S. PATENT DOCUMENTS 2,119,906 A * 6/1938 Dorman ................ A47J 43/121 261/DIG. 26
8,662,355 B2 * 3/2014 Spiegelberg ............. A47K 5/14 222/145.5
8,733,591 B2 * 5/2014 Ganzeboom .............. B23P 6/00 222/320
8,875,952 B2 * 11/2014 Ciavarella ................ A47K 5/14 222/401
10,874,262 B1 * 12/2020 Huang ..................... A47K 5/12
2009/0184136 A1 * 7/2009 Ciavarella ............. B05B 7/0037 222/190
2009/0188944 A1 * 7/2009 Ciavarella ................ A47K 5/14 222/190
2009/0294477 A1 * 12/2009 Ciavarella ........... B05B 11/1032 222/207
2009/0294478 A1 * 12/2009 Ciavarella ........... B05B 11/1087 222/207
2009/0308894 A1 * 12/2009 Ophardt ............... A47K 5/1211 417/521
2009/0314806 A1 * 12/2009 Ray ...................... A47K 5/1207 222/145.5
2010/0200615 A1 * 8/2010 Ciavarella ........... B05B 11/1087 222/207
2012/0308405 A1 * 12/2012 McNulty ............... B05B 7/0025 29/888.02

(Continued)

*Primary Examiner* — Charles P. Cheyney
(74) *Attorney, Agent, or Firm* — JEEN IP LAW, LLC

(57) ABSTRACT

This application discloses the hand sanitizer device which includes at least outlet tube and foaming sub-assembly. Said outlet tube's end connects with said foaming sub-assembly via the water tube fitting, allowing gas-liquid mixture to transmit through said outlet tube, said water tube fitting and to said foaming sub-assembly. Said foaming sub-assembly includes shell and foaming part, wherein said shell has the through hole and internal threads at one end. Said shell with internal threads connects with said water tube fitting with external threads at the end. The other end of said shell has the contact part extending internally from the other end's edge of said through hole, within which said foaming part is located and pressed between said contact part and the end of said water tube fitting. Technical proposals from this application can facilitate the changing, maintaining and cleaning the foaming part of the hand sanitizer device for users.

6 Claims, 6 Drawing Sheets

(56) References Cited

U.S. PATENT DOCUMENTS

| | | | | |
|---|---|---|---|---|
| 2014/0008394 | A1* | 1/2014 | Hofte | B05B 11/043 222/211 |
| 2015/0034680 | A1* | 2/2015 | Babikian | B05B 11/0097 222/321.9 |
| 2015/0136807 | A1* | 5/2015 | Wang | B05B 11/1023 222/190 |
| 2018/0360276 | A1* | 12/2018 | Yang | F04B 43/0063 |
| 2022/0008943 | A1* | 1/2022 | Kimura | B05B 11/1087 |

* cited by examiner

HAND SANITIZER DEVICE

TECHNICAL FIELD

This application is involved in the field of cleaning technology, especially with the hand sanitizer device.

BACKGROUND OF THE PRESENT INVENTION

With the improvement of living standards, more and more families start to use the hand sanitizer device that allows the hand sanitizer automatically to be extruded when the users use it, making it convenient for using.

However, when in actual use, the clogging situation frequently occurs in the foaming sub-assembly and hence hindering the hand sanitizer device from feeding liquid and generating foam. Moreover, since the foam sub-assembly of the existing hand sanitizer device is mostly in integration, the maintenance solely on the sub-assembly is difficult to proceed. Users usually tend to replace the hand sanitizer device, leading the short service life of the device.

SUMMARY OF PRESENT INVENTION

The purpose of this application is to offer the hand sanitizer device that facilitates the processes of changing, maintaining and cleaning the foaming part of the hand sanitizer device for users.

In order to realize the aforementioned purposes, on one hand, this application offers the hand sanitizer device, which includes at least the outlet tube and the foaming sub-assembly. The end of said outlet tube is connected with said foaming sub-assembly via the water tube fitting in order for the gas-liquid mixture to transmit through said outlet tube to said water tube fitting and to said foaming sub-assembly. Said foaming sub-assembly includes the shell and the foaming part, wherein said shell is designed to have the through hole and the internal threads at one end. Said shell with internal threads is jointed with said water tube fitting with external threads at the end via threaded connection. The other end of said shell has the contact part. Said contact part extends internally from the edge of the other end of said through hole. Said foaming part is located within said through hole and is pressed between said contact part and the end of said water tube fitting.

In order to realize the aforementioned purposes, on the other hand, this application offers the hand sanitizer device, which includes at least the outlet tube and the foaming part. The end of said outlet tube is connected with said foaming part via the water tube fitting in order for the gas-liquid mixture to transmit through said outlet tube to said water tube fitting and to said foaming part. Said foaming part includes the supporting ring, the first foaming net and the second foaming net. Said supporting ring should at least partially locate within said water tube fitting and forms detachable connection with said water tube fitting. Said first foaming net is located at one end of the supporting ring and covers the opening of one end of said supporting ring. Said second foaming net is located at the other end of the supporting ring and covers the opening of the other end of said supporting ring.

Thus, from the technical proposal provided by this application, the foaming sub-assembly includes the shell and the foaming part. The shell is connected to the end screw threads of the water tube fitting. And the other end of the shell has the contact part. The contact part extends internally from the edge of the other end of said through hole. The foaming part is located within said through hole and is pressed between said contact part and the end of said water tube fitting. In this case, when the clogging situation occurs in the foaming part, uses can take out the foaming part from the shell by detaching the water tube fitting from the shell so as to maintain, clean and replace the foaming part. In comparison to the existing method of integrated foaming part, this application makes the maintenance on the foaming part of the hand sanitizer device convenient and lowers the maintenance cost for the users by avoiding the overall replacement.

BRIEF DESCRIPTION OF THE DRAWINGS

In order to better illustrate the technical proposals in this application, the following conducts a brief introduction to drawings necessarily used in the descriptions to the implementation examples. Obviously, the drawings attached from the following descriptions are merely some of the implementation examples. To the general technicians in this field, they may obtain other drawings basing on these drawings without making inventive efforts.

DESCRIPTIONS TO THE MARKS IN THE DRAWINGS

Figure 1:
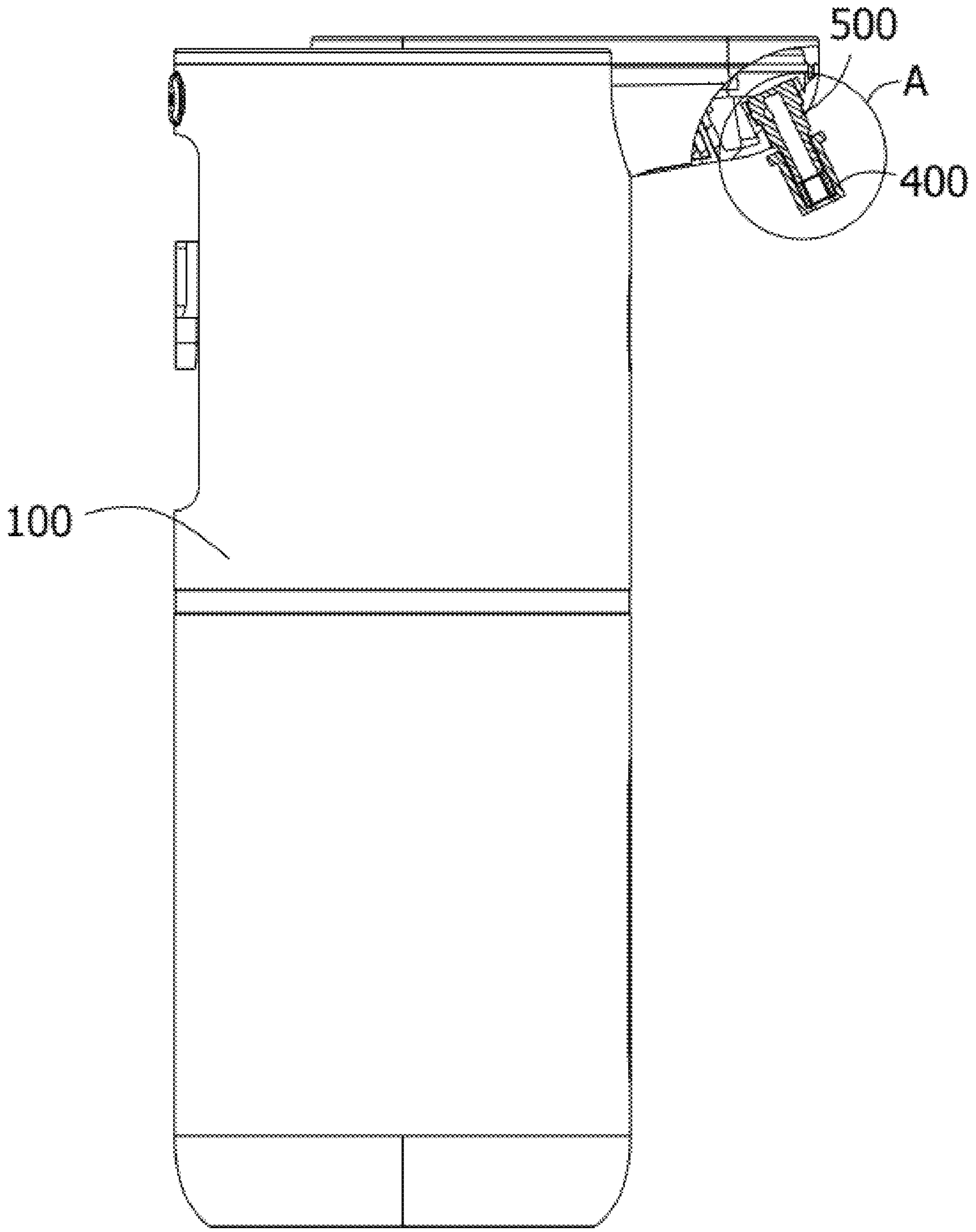
FIG. 1 is an axonometric drawing of the hand sanitizer device in one implementation method provided in this application.
Figure 2:
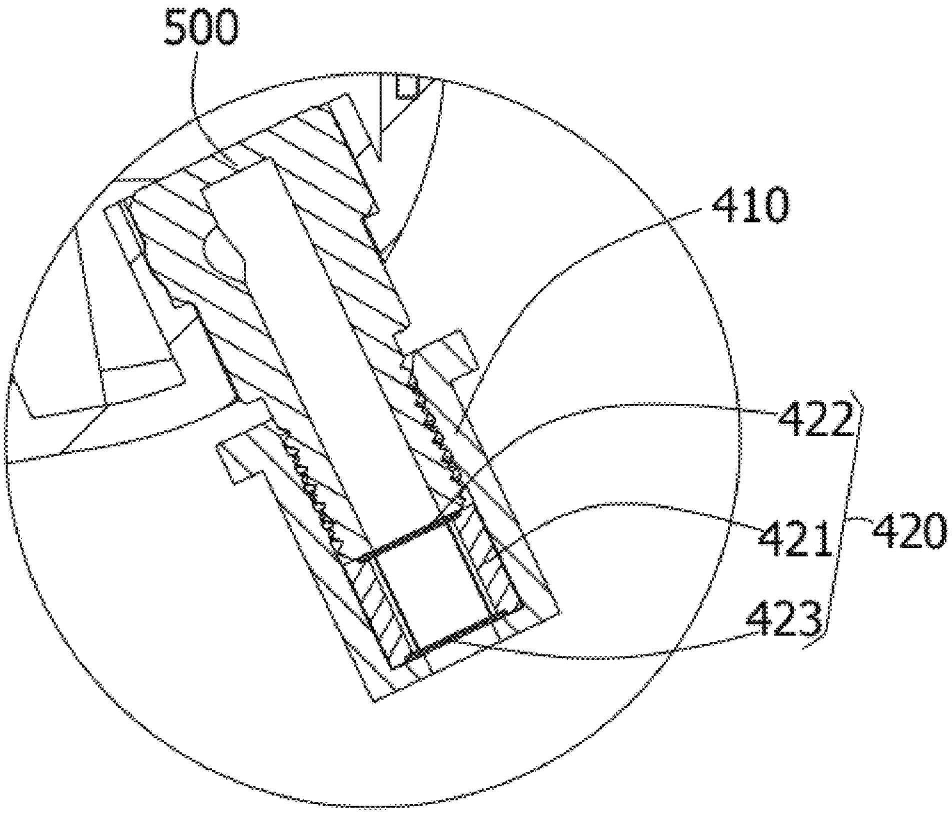
FIG. 2 is the magnification drawing of part A of FIG. 1.
Figure 3:
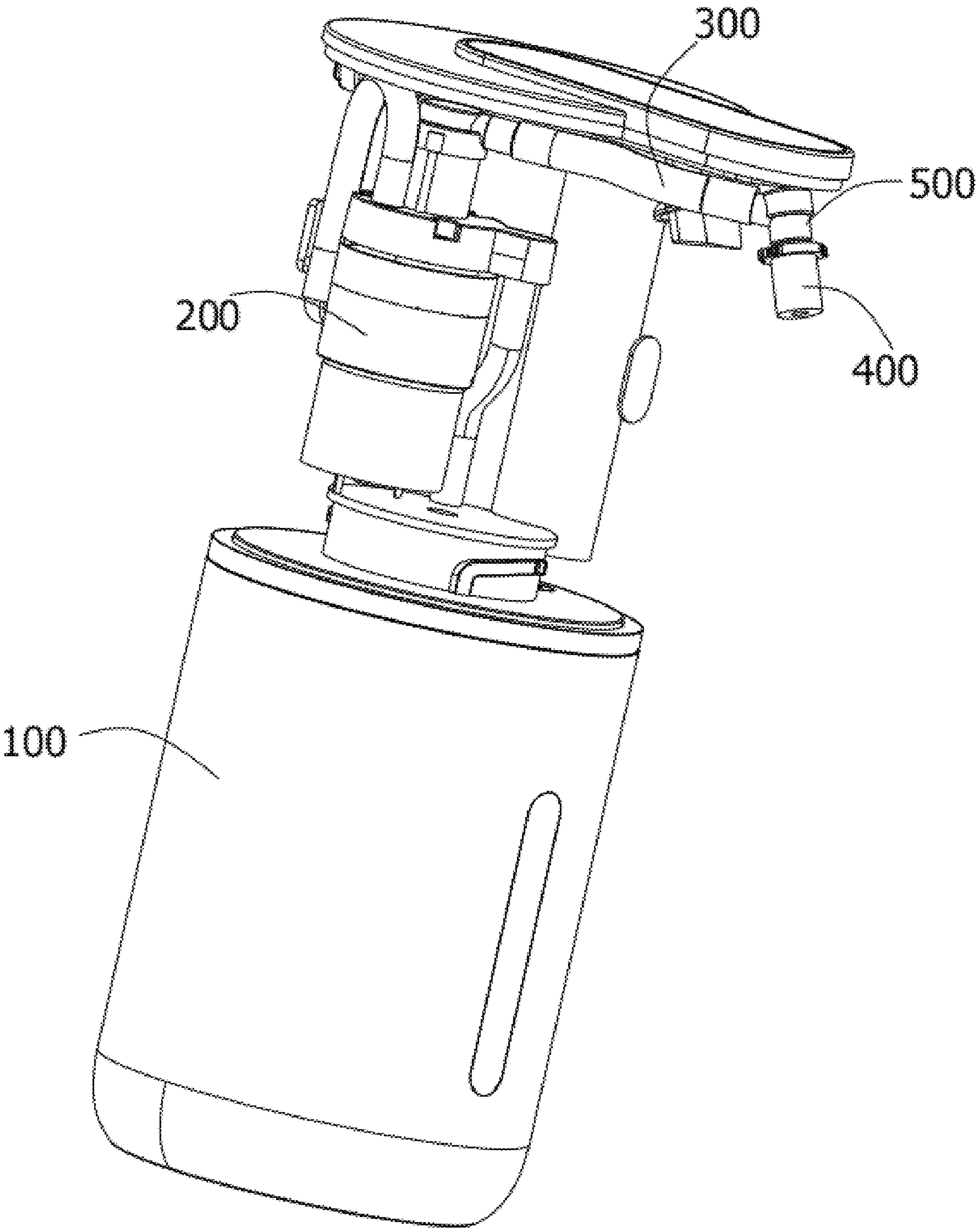
FIG. 3 is a partial structural drawing of the hand sanitizer device in one implementation method provided in this application.
Figure 4:
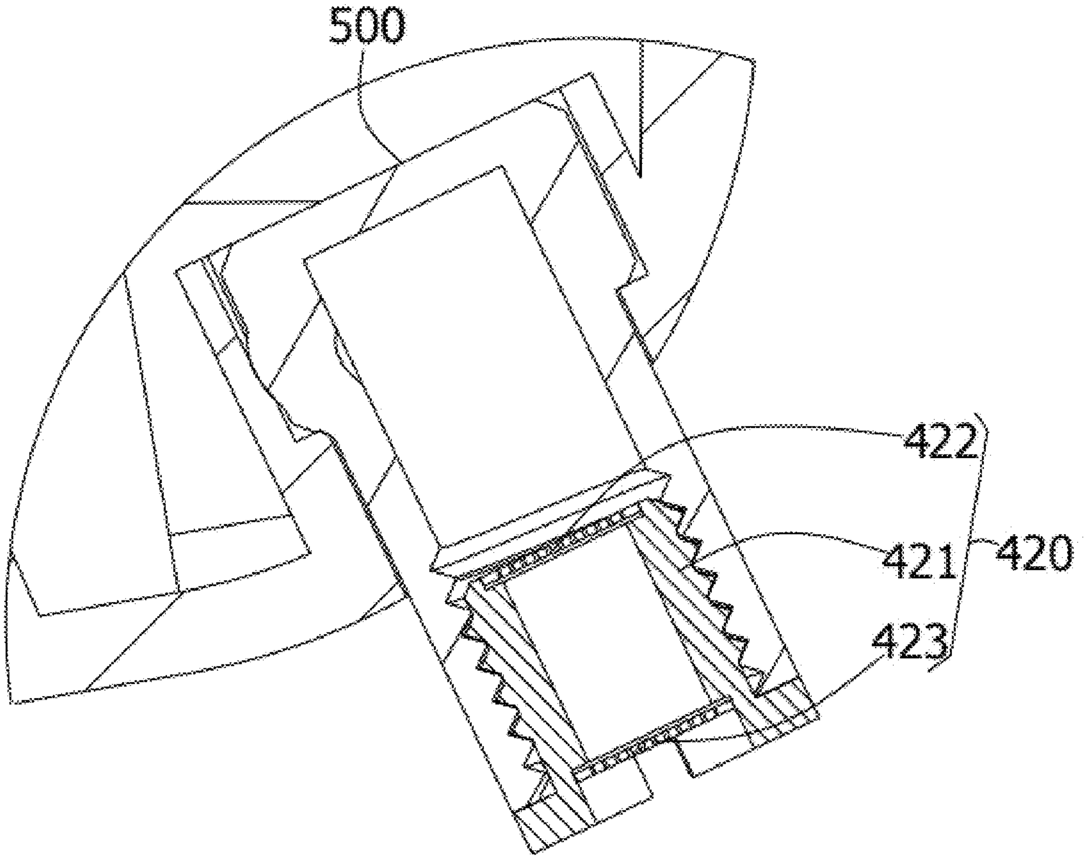
FIG. 4 is a semi-sectional structural drawing of the connected foaming sub-assembly and the water tube fitting in one implementation method provided in this application.
Figure 5:
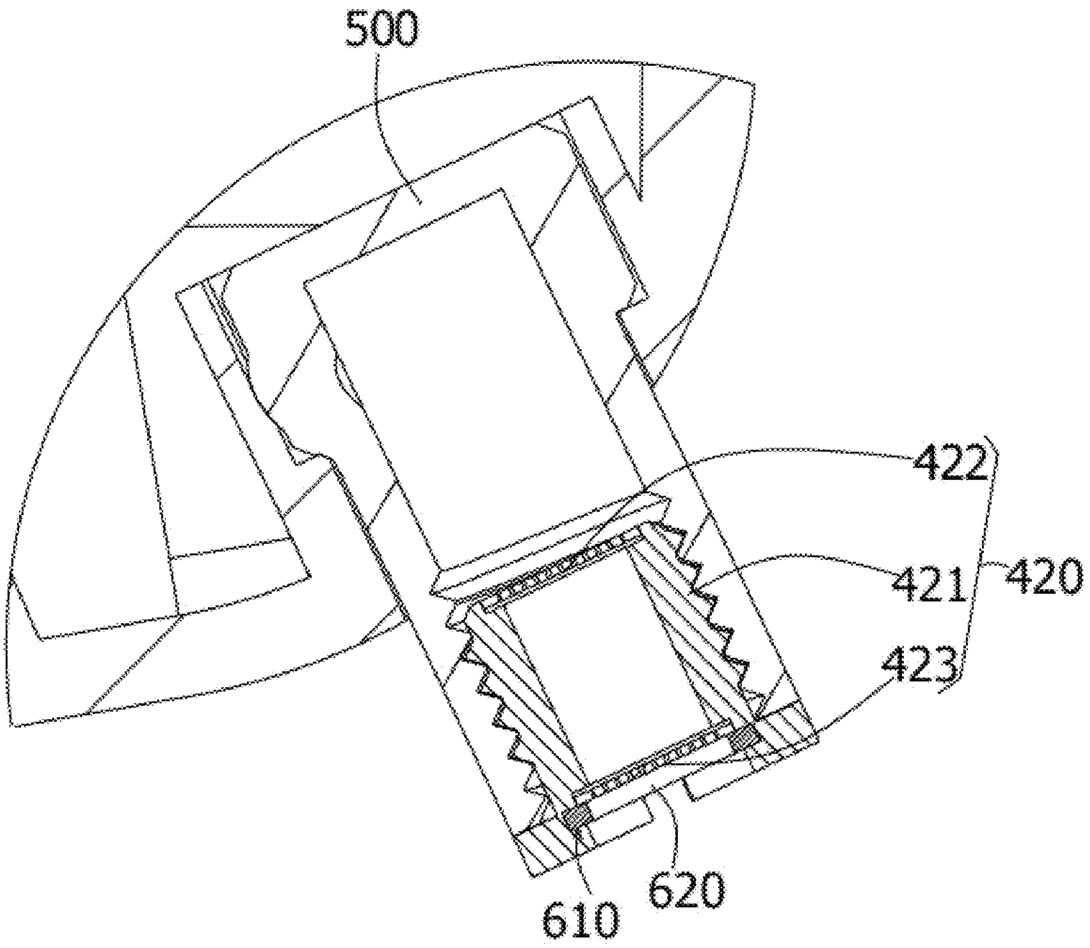
FIG. 5 is a semi-sectional structural drawing of the connected foaming sub-assembly and the water tube fitting in another implementation method provided in this application.
Figure 6:
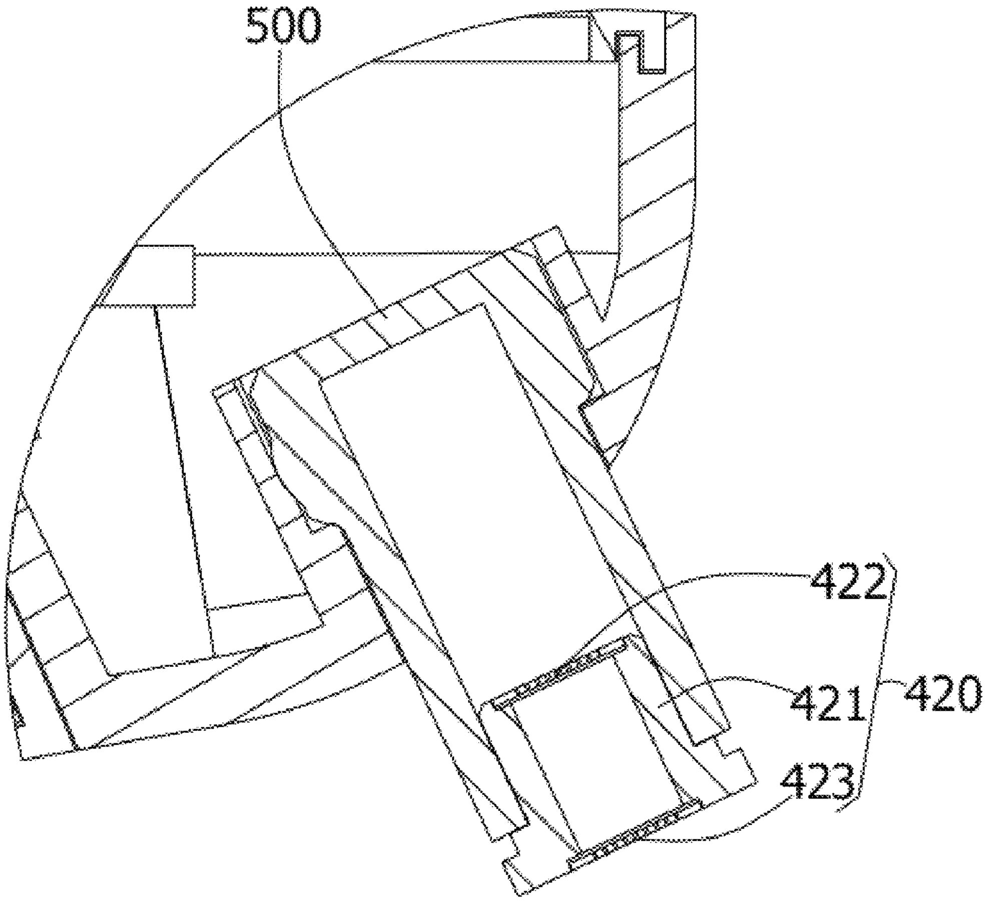
FIG. 6 is a semi-sectional structural drawing of the connected foaming sub-assembly and the water tube fitting in another implementation provided in this application.

100, main body part; 200, solution-feeding part; 300, outlet tube; 400, foaming sub-assembly; 410, shell; 420, foaming part; 421, supporting ring; 422, first foaming net; 423, second foaming net; 500, water tube fitting; 610, groove; 620, rubber gasket.

Detailed Description of the Embodiment's

To make the purposes, technical proposals and advantages of this application more clearly, the implementation methods of this application will be further described in details combining the drawings in the following. This application uses the terms of spatial relative position such as "up", "upward", "down", "downward", "first end", "second end", "one end", "the other end" for the purpose of making easy illustrations to describe one unit relative to another unit, or one characteristic to another characteristic. The terms of spatial relative position can aim to include different positions, aside from the positions of the devices in use or under work shown in the drawings. For example, if the device in the drawing is overturned, it will be described as at the "downward" to other units or characteristics or as the "down" unit or characteristic located at the "upward" of other units or characteristics. Therefore, exemplary term "downward" can refer to up and down, two directions. The device can be fixed (at 90 degrees or in other directions) with other methods, and then used to explain the descriptions relative to space stated in this application accordingly.

Furthermore, the terms like "installation", "setting", "designing", "connection", "slip joint", "fixing", "bell and spigot joint" should be comprehended in a broad sense. For example, "connection" could be fixed connection, detachable connection, or overall construction; could be mechanical connection, or electric connection; could be connected directly, connected via intermedia or connected internally between two devices, two components or two sub-assemblies. To the general technicians in this field, they may understand the specific meanings of the aforementioned terms in this application with a situational perspective.

With the improvement of living standards, more and more families start to use the hand sanitizer device that allows hand sanitizer automatically to be extruded when the users use it, making it convenient for using.

However, when in actual use, the clogging situation frequently occurs in the foaming sub-assembly and hence hindering the hand sanitizer device from feeding liquid and generating foam. Moreover, since the foam sub-assembly of the existing hand sanitizer device is mostly in integration, the maintenance solely on the sub-assembly is difficult to proceed. Users usually tend to replace the hand sanitizer device, leading the short service life of the device.

Thus, how to address the hand sanitizer devices' issue of easily getting clogged, maintenance difficulties, and the high manufacturing cost has become an urgent task for the technicians in this field to tackle.

The following is a clear and complete description of the technical proposals in the implementation of this application in conjunction with the attached drawings. Obviously, the implementation methods described in this application is merely partial and not all. Basing on the implementation methods in the application, any other implementation methods obtained by the technicians in this field without making inventive efforts should be included in the scope of protection of this application.

Please refer to drawing 1 to drawing 3. With a viable implementing method, this application provides the hand sanitizer device, which could include the main body part 100, solution-feeding part 200, outlet tube 300 and foam sub-assembly 400, wherein main body 100 acts as the fundamental carrier of the hand sanitizer device and serves the carrying function to other parts. Main body part 100 contains the solution chamber, which is used to store the solution (hand sanitizer). Solution-feeding part 200 acts as the drive part, whose inlet is connected with said solution chamber and outlet is connected with one end of said outlet tube 300. Solution-feeding part 200 is used to extract the solution from said solution chamber so as to form and transmit the gas-liquid mixture to said outlet tube 300 to the outside. In actual use, outlet tube 300 could be the passage formed within main body 100, or the tunnel made of PVC, metal or others.

In this implementation method, by connecting the end of outlet tube 300 with water tube fitting 500 and foam sub-assembly 400, the gas-liquid mixture is transmitted from outlet tube 300, to water tube fitting 500, and to foam sub-assembly 400. Foaming sub-assembly 400 includes the shell 410 and the foaming part 420, wherein shell 410 is designed to have the through hole and the internal threads at one end. Shell 410 with internal threads is jointed with said water tube fitting 500 with external threads at the end via threaded connection. The other end of shell 410 has the contact part. The contact part extends internally from the edge of the other end of the through hole. Foaming part420 is located within said through hole and is pressed between contact part and the end of water tube fitting 500.

What calls for special attention is that the application is conducting the connection between the shell 410 and the end screw threads of water tube fitting 500. And the other end of the shell 410 has the contact part. The contact part extends internally from the edge of the other end of the through hole. The foaming part 420 is located within said through hole and is pressed between the contact part and the end of water tube fitting 500. In this case, when the clogging situation occurs in the foaming part 420, uses can take out the foaming part 420 from the shell 410 by detaching the water tube fitting 500 from the shell 410 so as to maintain, clean and replace the foaming part 420. In comparison to the existing method of integrated foaming part 400, this application makes the maintenance on the foaming part 400 of the hand sanitizer device convenient and lowers the maintenance cost for the users by avoiding the overall replacement.

Please refer to drawing 2 again. With a viable implementing method, the foaming part 420 includes the supporting ring 421, the first foaming net 422 and the second foaming net423. The first foaming net 422 is located at one end of the supporting ring 421 and covers the opening of one end of the supporting ring 421. The second foaming net 423 is located at the other end of the supporting ring 421 and covers the opening of the other end of the supporting ring 421.

For reference, this application provides two feasible implementing examples for the detailed connection methods of the first foaming net 422, the second foaming net 423 and the supporting ring 421.

Implementation example one: the first foaming net 422 is pressed at one end of the supporting ring 421 by the water tube fitting 500 and the supporting ring 421. The second foaming net 423 is pressed at the other end of the supporting ring 421 by the supporting ring 421 and the contact part. In this way, there is no fixed relation between the first foaming net 422, the second foaming net 423 and the supporting ring 421. When the water tube fitting 500 is detached from the shell 410, the first foaming net 422, the second foaming net 423 and the supporting ring421 can automatically be separated. This will make it more convenient to clean the clogging of the first foaming net 422 and the second foaming net 423.

Implementation example two: the first foaming net 422 and the second foaming net 423 are connected with the supporting ring 421 by the method of welding or interference fit.

Please refer to drawing 4-6. For the same purpose of making it more convenience for users to replace, maintain and clean the foaming part of the hand sanitizer device, this application also provides another hand sanitizer device. This hand sanitizer device includes at least the outlet tube 300 and the foaming part 420. The end of the outlet tube 300 is connected with the foaming part 420 via the water tube fitting 500 in order for the gas-liquid mixture to transmit through the outlet tube 300 to the water tube fitting 500 and to the foaming part 420. The foaming part 420 includes the supporting ring 421, the first foaming net 422 and the second foaming net 423. The supporting ring 421 should at least partially locate within the water tube fitting 500 and form detachable connection with the water tube fitting 500. The first foaming net 422 is located at one end of the supporting ring 421 and covers the opening of one end of the supporting ring. Said second foaming net is located at the other end of the supporting ring 421 and covers the opening of the other end of the supporting ring 421.

What calls for special attention is that the application is conducting a detachable connection between the foaming part 420, the support ring 421 and the water tube fitting 500. Thus, when there is a clogging situation occurring in the foaming part 420, uses can take apart the foaming part 420 and the water tube fitting 500, separate them, and then take the foaming part out to maintain, clean or replace. In comparison to the existing method of integrated foaming part 400, this application makes the maintenance on the foaming part 400 of the hand sanitizer device convenient and lowers the maintenance cost for the users by avoiding the overall replacement.

For reference, this application provides two feasible implementation examples for the detailed connection methods of the supporting ring 421 and the water tube fitting 500.

Implementation example one: please refer to drawing 4. The outer surface of the support ring 421 is formed with external threads while the inter surface of the water tube fitting 500 is formed with internal threads. The supporting ring 421 with external threads and the water tube fitting 500 with internal threads are jointed via threaded connection.

Implementation example two: please refer to drawing 6. The outer diameter of the support ring 421 should be compatible with the inner diameter of the water tube fitting 500 so that the support ring 421 is inserted in the water tube fitting 500 via interference fitting.

Moreover, as what drawing 5 shows, it is making it more convenient to clean first foaming net 422 and the second foaming net 423. In an achievable implementing method, one end of the supporting ring 421's inner surface is formed with the groove 610. The groove 610 is fitted with the rubber gasket 620. The rubber gasket 620 is used to confine the first foaming net 422 within one end of the supporting ring 421 and the rubber gasket620. To clean the dirty spots, the rubber gasket 620 can be taken out first, making it easier to take out the first foaming net 422 and then clean the both sides of the first foaming net 422 and the second foaming net 423.

Or the other end of the supporting ring 421's inner surface is formed with groove 610. The groove 610 is fitted with the rubber gasket 620. The rubber gasket 620 is used to confine the second foaming net 423 within the other end of the supporting ring 421 and the rubber gasket 620. To clean the dirty spots, the rubber gasket 620 can be taken out first, making it easier to take out the second foaming net 423 and then clean the both sides of the first foaming net 422 and the second foaming net 423.

It is no doubt that the aforementioned first foaming net 422 and second foaming net 423 can be connected with the supporting ring 421 by the method of welding or interference fit. This application makes no specific restrictions to it.

Thus, from the technical proposal provided by this application, the foaming sub-assembly includes the shell and the foaming part. The shell is connected to the end screw threads of the water tube fitting. And the other end of the shell has the contact part. The contact part extends internally from the edge of the other end of said through hole. The foaming part is located within said through hole and is pressed between said contact part and the end of said water tube fitting. In this case, when the clogging situation occurs in the foaming part, uses can take out the foaming part from the shell by detaching the water tube fitting from the shell so as to maintain, clean and replace the foaming part. In comparison to the existing method of integrated foaming part, this application makes the maintenance on the foaming part of the hand sanitizer device convenient and lowers the maintenance cost for the users by avoiding the overall replacement.

Furthermore, the first foaming net is pressed at one end of the supporting ring by the water tube fitting and the supporting ring. The second foaming net is pressed at the other end of the supporting ring by the supporting ring and the contact part. In other words, when the water tube fitting is detached from the shell, the first foaming net, the second foaming net and the supporting ring can automatically be separated. This will make it more convenient to clean the clogging of the first foaming net and the second foaming net.

Aforementioned implementing examples are merely the preferred ones of this application and do not confine this application. Within the spirit and principles of this application, any modification, equivalent replacement, improvement and others should be included in the scope of protection of this application.

The invention claimed is:

1. A hand sanitizer device, comprising at least an outlet tube and a foaming sub-assembly;

wherein the outlet tube is connected to the foaming sub-assembly via a water tube fitting in order for a gas-liquid mixture to be transmitted through the outlet tube, to the water tube fitting, and to the foaming sub-assembly;

wherein the foaming sub-assembly comprises a shell and a foaming part, wherein there is defined a through hole in the shell, wherein there is disposed an internal thread at one end of the shell, the end of the shell being an upstream end of the shell, wherein there is disposed a flange at the upstream end of the shell; wherein the shell is jointed with the water tube fitting via a threaded connection between the internal thread of the shell and an external thread at a free end of the water tube fitting; wherein another end of the shell has a contact part that extends internally from an edge of another end of the through hole;

wherein the foaming part is disposed within said through hole and is pressed between the contact part and the free end of said water tube fitting;

wherein the foaming part consists of a supporting ring, a first foaming net, and a second foaming net; wherein the first foaming net is disposed at one end of the supporting ring and covers an opening of one end of the supporting ring; wherein the second foaming net is disposed at another end of the supporting ring and covers an opening of another end of the supporting ring.

2. The hand sanitizer device as recited in claim 1, wherein the first foaming net is pressed at the end of the supporting ring by the water tube fitting and the supporting ring;

wherein the second foaming net is pressed at the other end of the supporting ring by the supporting ring and the contact part.

3. The hand sanitizer device as recited in claim 1, wherein the first foaming net and the second foaming net are connected with the supporting ring by means of welding or an interference fit.

4. The hand sanitizer device as recited in claim 1, further comprising a main body part and a solution-feeding part, wherein the main body part defines a solution chamber;

wherein an inlet of the solution-feeding part is connected to the solution chamber; wherein an outlet of the solution-feeding part is connected to one end of the outlet tube; wherein the solution-feeding part is used to extract a solution from the solution chamber so as to form and transmit the gas-liquid mixture to the outlet tube.

5. A hand sanitizer device, comprising at least an outlet tube and a foaming part;

wherein the outlet tube is connected to the foaming part via a water tube fitting in order for a gas-liquid mixture to be transmitted through the outlet tube, to the water tube fitting, and to the foaming part;

wherein the foaming part comprises a supporting ring, a first foaming net, and a second foaming net; wherein the supporting ring is at least partially disposed within said water tube fitting and is detachably connected with the water tube fitting; wherein the first foaming net is disposed at one end of the supporting ring and covers an opening of the end of the supporting ring, and wherein the second foaming net is disposed at another end of the supporting ring and covers an opening of the other end of the supporting ring;

wherein there is disposed an external thread at an outer surface of the support ring and there is disposed an internal thread at an inner surface of the water tube fitting, wherein the supporting ring is jointed with the water tube fitting via a threaded connection of the external thread of the supporting ring and the internal thread of the water tube fitting;

wherein there is defined a groove in one end of an inner surface of the supporting ring; wherein there is fitted a rubber gasket inside the groove, the rubber gasket being used to confine the first foaming net within one end of the supporting ring and the rubber gasket; or there is defined a groove in another end of the inner surface of the supporting ring; wherein there is fitted a rubber gasket inside the groove, the rubber gasket being used to confine the second foaming net within the other end of the supporting ring and the rubber gasket.

6. The hand sanitizer device as recited in claim 5, wherein the first foaming net and the second foaming net are connected to the supporting ring by means of welding or an interference fit.

* * * * *